June 29, 1954 — H. H. WOERDEMANN — 2,682,633
INVERTER FREQUENCY REGULATOR
Filed April 5, 1952 — 3 Sheets-Sheet 1

INVENTOR.
HUGO H. WOERDEMANN
BY William R. Lane
ATTORNEY

June 29, 1954    H. H. WOERDEMANN    2,682,633
INVERTER FREQUENCY REGULATOR

Filed April 5, 1952    3 Sheets-Sheet 2

INVENTOR.
HUGO H. WOERDEMANN
BY
William L. Lane
ATTORNEY

June 29, 1954   H. H. WOERDEMANN   2,682,633
INVERTER FREQUENCY REGULATOR
Filed April 5, 1952   3 Sheets-Sheet 3

INVENTOR.
HUGO H. WOERDEMANN
BY William R. Lane
ATTORNEY

Patented June 29, 1954

2,682,633

UNITED STATES PATENT OFFICE 2,682,633

INVERTER FREQUENCY REGULATOR

Hugo H. Woerdemann, Whittier, Calif., assignor to North American Aviation, Inc.

Application April 5, 1952, Serial No. 280,841

13 Claims. (Cl. 322—32)

This invention relates to frequency regulators, and particularly to an automatic regulator for controlling with increased accuracy the frequency of the output of a motor-driven alternator.

Inverters are normally used as power supplies under conditions not justifying the use of line power at the desired frequency, or for special power requirements of a limited nature under isolated or temporary conditions. A typical use of an inverter is in an aircraft. In nearly all the applications of an inverter the components thereof must withstand rough handling, must be capable of use under a variety of ambient conditions, preferably should involve no electronic tubes or moving parts, and should require a minimum of maintenance. The inverter itself, a rather rugged rotating machine, satisfies these conditions admirably. However, past attempts to obtain really accurate frequency control of an inverter have resulted in devices having electronic tubes, carbon piles, or other components sensitive to shock and temperature change, and requiring considerable maintenance. Most frequency regulating devices utilize as a frequency sensing circuit an amplitude comparison between two off-resonant tuned resonance circuits. This invention contemplates provision of a more accurate inverter frequency control by utilizing a phase sensing circuit which measures variations in phase difference between the voltage and current in a single tuned circuit, which uses no electronic tubes, and which requires a minimum of maintenance.

It is therefore an object of this invention to provide a simplified inverter frequency control.

It is another object of this invention to provide an inverter frequency control employing saturable reactors.

It is another object of this invention to provide an inverter frequency control of increased accuracy.

It is another object of this invention to provide a frequency sensing circuit which is sensitive to very small changes in frequency.

Other objects of invention will become apparent from the following description taken in connection with the accompanying drawings, in which Fig. 1 is a schematic diagram of the invention;

Figure 1:
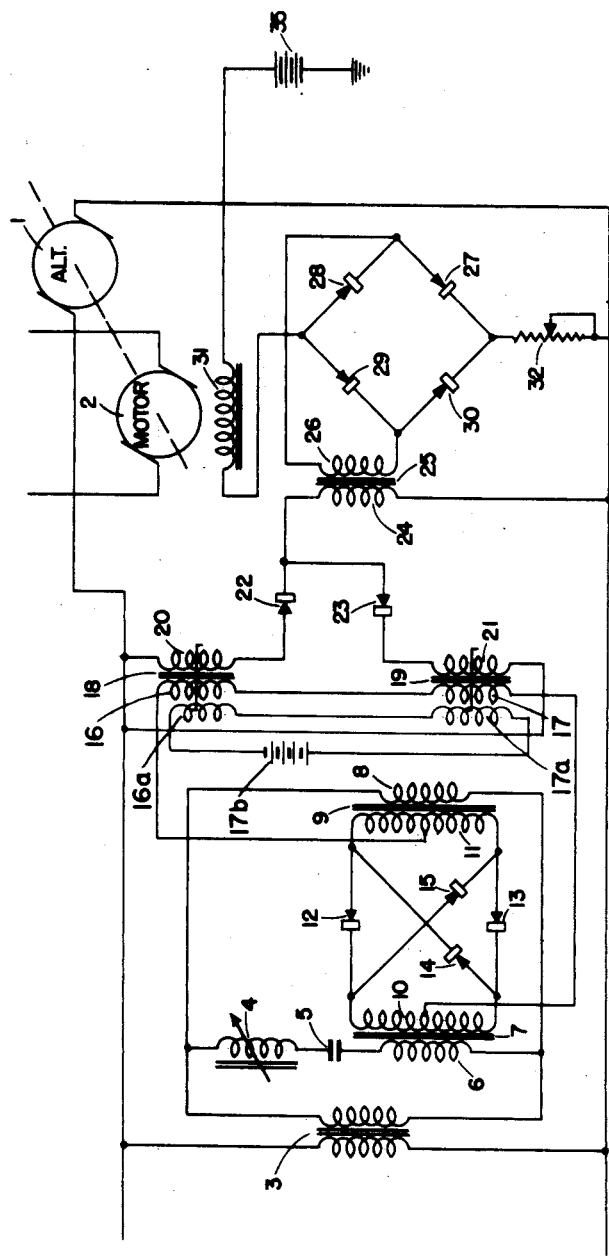

Referring to the drawings, and particularly to Fig. 1, there is shown an alternator 1 having a single phase output and driven by a motor 2. For purposes of this invention it is immaterial whether the alternator has a single or three-phase output, but for convenience only a single phase is treated herein. The primary of transformer 3 is connected across the output terminals of alternator 1, and the secondary of transformer 3 is connected across inductance 4, a capacitance 5, and primary winding 6 of transformer 7 in series. In parallel with the foregoing three elements is the primary winding 8 of transformer 9. While inductance 4 is shown as variable, it is to be understood that inductance 4 may be fixed in value and capacitance 5 may be variable, or both inductance 4 and capacitance 5 may be variable, the desired result being that the circuit be tunable. In addition, while a series resonant circuit is formed by capacitance 5 and inductance 4 it is to be understood that a parallel resonant circuit could be used with equal advantage. The secondary windings 10 and 11 of transformers 7 and 9 are connected together by rectifiers 12, 13, 14, and 15 as shown in Fig. 1. Secondary windings 10 and 11 are center-tapped and connected to control windings 16 and 17 of saturable reactors 18 and 19 which also carry load windings 20 and 21 connected to one terminal of alternator 1. Bias windings 16a and 17a supply bias from an external source 176 to saturable reactors 18 and 19 so that for zero control current said saturable reactors have a small zero output. Rectifiers 22 and 23 and primary winding 24 of transformer 25 complete the magnetic amplifier of which saturable reactors 18 and 19 are a part; and the output of transformer 25 as developed in secondary winding 26 is fed to a bridge network including rectifiers 27, 28, 29, and 30, the function of which is to control the current in field winding 31 of motor 2. The actual magnitude of said current is, in part, dependent also upon the voltage supplied by battery 35, and is adjustable by a variable resistance 32.

Figure 5:
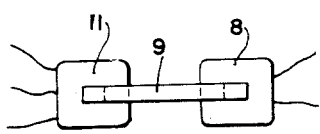
Fig. 5 is a detailed drawing of a transformer of this invention.
Figure 6:
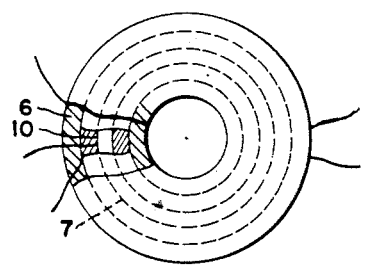
Fig. 6 is a detailed drawing of a second transformer of this invention.

In operation, the resonant frequency of the series resonant circuit formed by inductance 4 and capacitance 5 is set at the desired output frequency of alternator 1. Preferably, this circuit should be a high Q circuit for optimum sensitivity. The primary circuit of transformer 9 is designed so as to cause the voltage in winding 11 to be approximately 90 degrees out of phase with the line voltage of the alternator. The design of transformer 7, on the other hand, is such that when the output frequency of alternator 1 is equal to the resonant frequency of the series resonant circuit, the voltage in transformer secondary winding 10 is in phase with the line voltage. These results may be attained in actual practice, for example, by winding transformers 7 and 9 on identical toroidal cores with similar numbers of primary and secondary turns, but with the windings of transformer 7 distributed and superimposed, and the windings of transformer 9 separated and segregated. Transformer 9 is shown in detail in Fig. 5 and transformer 10 in Fig. 6. As the frequency of the alternator departs from this resonant frequency, then, the current in primary winding 6 of transformer 7 either leads or lags the voltage across the series resonant circuit by a phase angle which increases sharply with increase or decrease of alternator frequency, and hence the voltage developed by secondary 10 similarly leads or lags the line voltage.

Figure 3:
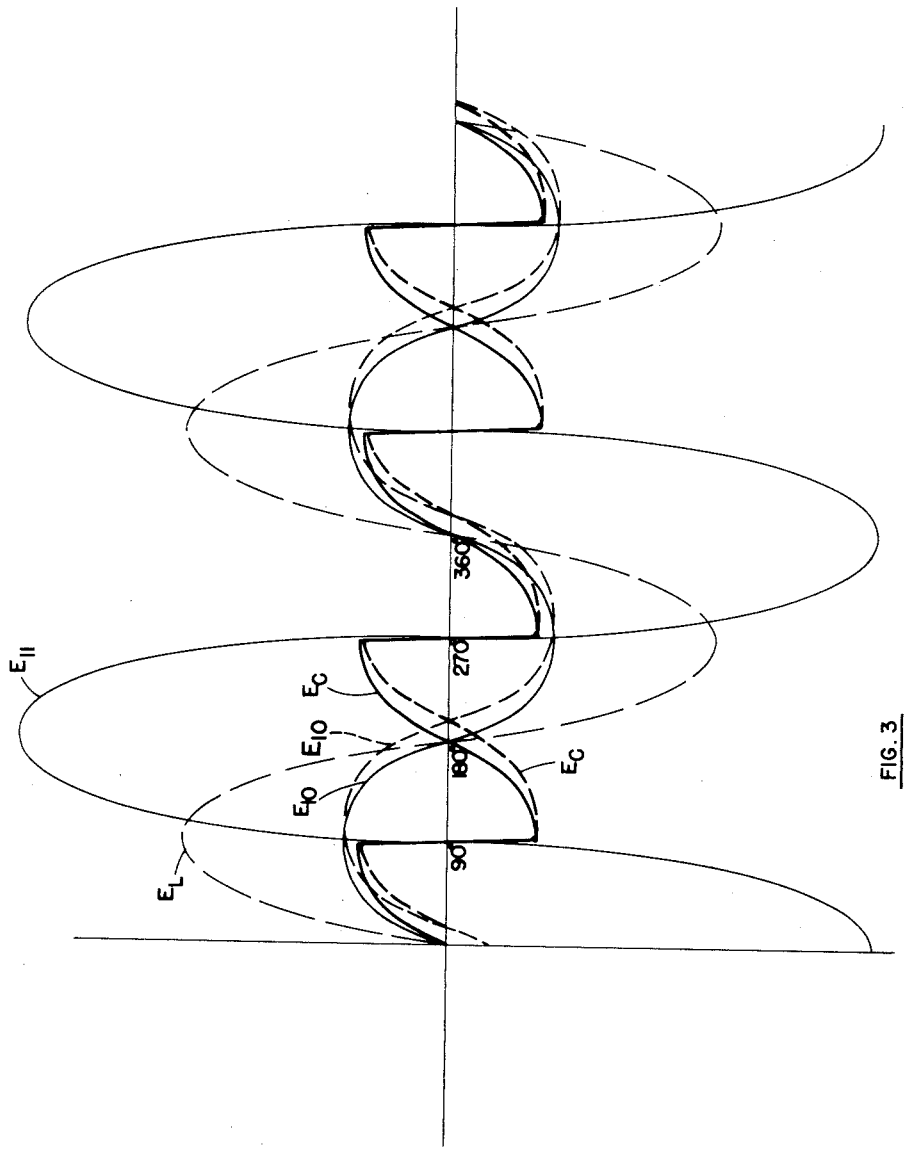
Fig. 3 is a plot of voltages developed at various points in the invention.

Referring to Fig. 3 there is shown a plot against time of the voltage $E_L$ developed across the alternator terminals, the voltage $E_{10}$ across the secondary of transformer 7 when the alternator frequency is equal to the resonant frequency of the resonant circuit consisting of inductance 4 and capacitance 5, and the voltage $E_{11}$ across the secondary of transformer 9. Also shown is the output voltage $E_C$ which appears across the center taps of transformer winding 10 and transformer winding 11. Voltages $E_C$ and $E_{10}$, when the output frequency of alternator 1 is above resonant frequency, are shown by dashed line plots in Fig. 3.

At the outset, it is to be noted that for optimum operation of the frequency sensing circuit of which transformers 7 and 9 are a part, it is preferable either that the maximum voltage developed across secondary winding 11 be at least double that developed across secondary winding 10, or that the maximum voltage developed across secondary winding 10 be at least double that developed across secondary winding 11. Further, the primary circuit for transformer 9 should be sufficiently inductive that the voltage in winding 11 lags the line voltage by 90 degrees. At resonance, the voltage developed across secondary winding 10 of transformer 7 is in phase with the line voltage of the alternator. This voltage is plotted as $E_{10}$ in Fig. 3. When the alternator frequency is exactly equal to the resonant frequency of the series resonant circuit comprising capacitance 5 and inductance 4 the following analysis is obtained. During a negative half cycle of the voltage developed across secondary winding 11, rectifiers 13 and 14 are effectively closed so that functionally they may be replaced by a short circuit or by a nominal resistance. Since the voltage $E_{11}$ exceeds $E_{10}$ during all but a very small part of the half cycle, rectifier 12 is forced to remain nonconducting, as is rectifier 15. The current caused to flow in the lower half of winding 10, however, may flow both through rectifier 14 or through rectifier 13, and through the halves of winding 11 through control windings 16 and 17 and back to the center tap of winding 10. Thus the voltage induced in winding 11 causes no current flow through the control windings, but a current caused to flow by the voltage $E_C$ represented in Fig. 3 does flow through the control windings. During the succeeding half cycle when $E_{11}$ becomes positive, rectifiers 13 and 14 become nonconducting, and rectifiers 15 and 12 conduct with the result that a current generated in the upper half of winding 10 flows through control windings 16 and 17. When $E_{10}$ goes through zero, the current through the control windings reverses polarity, as shown in Fig. 3, with the result that alternating current of twice the line frequency is caused to flow in the control windings. However, as shown in Fig. 3, since the area under the control voltage curve has no net value, there is no D.-C. component effective to influence the control of saturable reactors 18 and 19. Therefore, at resonance no control current flows and no corrective action is undertaken because saturable reactors 18 and 19 are so designed and properly biased by means well known in the art so that only a small current flows in primary winding 24 of transformer 25 when control current is zero. With the modification of the invention shown in Fig. 4 and hereinafter described, the saturable reactors may be biased so that for zero control current no current flows in primary winding 24. However, with the arrangement shown in Fig. 1 the magnetic amplifier actually contributes a small current to the motor field at resonance, which current is increased or decreased when control current flows in windings 16 and 17.

When the alternator frequency exceeds the natural frequency of inductance 4 and capacitance 5, the current in this branch of the circuit lags the voltage by an angle which is a function of the frequency difference. Since the phase of the voltage in winding 10 is related directly to the phase of the current in the primary of transformer 7, curves for the voltage in winding 10 and control voltage shown by the dotted lines in Fig. 3 result. It will be noted that $E_{10}$ does not lead $E_{11}$ by as great an amount as when the alternator frequency was equal to the resonant frequency of the series resonant circuit. However, since the rectifier switching still occurs at the same time, the result is simply that the control current flows a greater amount in one direction than in the other, as shown by the disparity in the areas below and above the abscissa axis in Fig. 3. Thus a net D.-C. current flows through control windings 16 and 17, the effect of which is to apply a correcting current to the field of motor 2 to decrease the alternator speed.

Obviously, when the alternator frequency falls below the desired value, $E_{10}$ leads $E_{11}$ by a greater amount, and a control current flows through control windings 16 and 17 in the opposite direction and motor 2 is speeded up to increase the alternator frequency.

Figure 2:
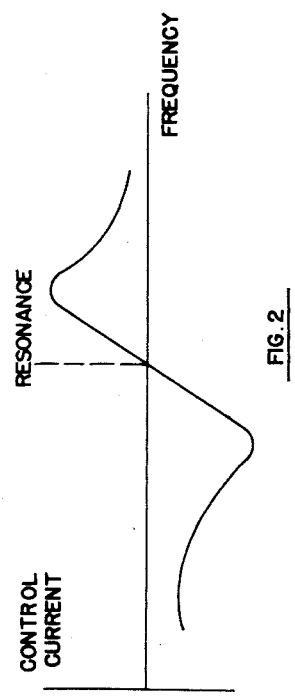
Fig. 2 is a plot of control current output from the sensing circuit of this invention versus the frequency of the alternator.

The plot of Fig. 2 shows the control current plotted against frequency of the alternator and, of course, indicates that at resonance no control current flows, and that control current flows in one direction when the alternator lags the desired frequency, and in the opposite direction when the alternator frequency is greater than the desired frequency.

Implicit in the curves of Fig. 3 is the assumption that the maximum voltage developed across winding 11 is larger than that developed across winding 10. If the maximum voltage developed across winding 10 is larger than that developed across winding 11, a similar wave form is achieved for the control voltage. However, when the two voltages are approximately equal, the output or control voltage assumes an approximately sinusoidal shape. In this case the net control current for a given shift in alternator frequency is smaller than when there is a considerable disparity between the two secondary winding voltages. Thus the sensitivity of the device is somewhat reduced, but it functions in the same manner as described.

Figure 4:
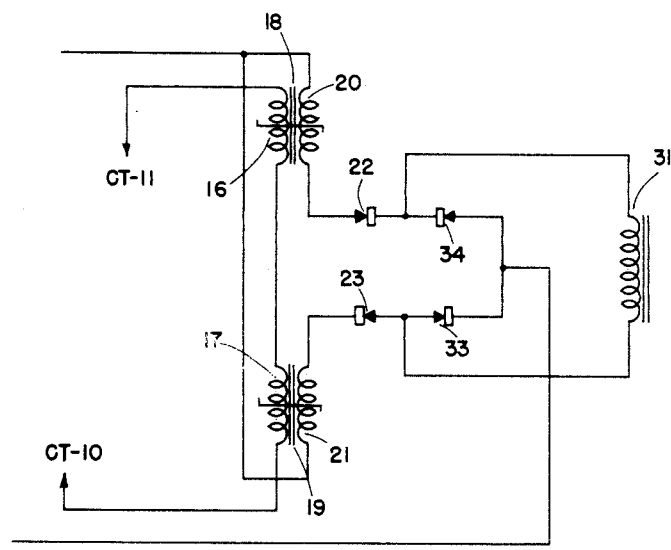
Fig. 4 is a circuit diagram of a modified form of the invention.

The fragmentary circuit diagram of Fig. 4 shows an arrangement whereby the entire field excitation of the motor is supplied by the magnetic amplifier. Additional rectifiers 33 and 34 are connected as shown, and battery 35 as well as rectifiers 27, 28, 29, and 30 and resistance 32 are eliminated.

There is thus provided a frequency sensing circuit of improved sensitivity, since instead of comparing amplitudes of output of two resonant circuits tuned to frequencies above and below the desired frequency, the phase of the current through a resonant circuit is compared with the phase of the voltage applied thereto. With the phase comparison means of this invention a signal of one polarity is developed if the frequency being monitored is above the desired frequency; and a signal of the opposite polarity is developed if the frequency being monitored is below the desired frequency. Inherently greater precision in measurement is thus possible than is possible by amplitude comparison of signals whose amplitude changes none too rapidly with frequency change. In addition, a completely automatic frequency regulator for an inverter is provided without resort to vacuum tubes or other components requiring frequent maintenance.

Although the invention has been described and illustrated in detail, it is to be clearly understood that the same is by way of illustration and example only and is not to be taken by way of limitation, the spirit and scope of this invention being limited only by the terms of the appended claims.

I claim:

1. Means for detecting the deviation of the frequency of an alternating current source from a predetermined value comprising a series inductive-capacitive circuit tuned to said predetermined frequency and connected across said source, and means for producing a signal in response to the difference in phase between the current flowing through said tuned circuit and the voltage of said source to thereby detect deviation of the frequency of said source from said predetermined value.

2. Frequency sensing means comprising an inductance, a capacitance connected in series with said inductance, and means responsive to the phase difference between the current flowing through and voltage applied to said inductance and capacitance whereby if an alternating current is applied to said inductance and capacitance in series the phase difference between said current and voltage is a measure of the difference between the frequency of said alternating current and the natural frequency of said inductance and capacitance.

3. A device as recited in claim 2 and further comprising means for producing a signal in response to said phase difference, and means responsive to said signal for changing the frequency of said alternating current in the sense required to reduce said signal to thereby control said frequency.

4. A device as recited in claim 2 in which said alternating current is produced by an alternating current generator, and further comprising a motor for driving said generator, means for producing a signal in response to said phase difference, and means responsive to said signal for regulating the speed of said motor in the sense required to reduce said signal to thereby control the frequency of said alternating current generator.

5. Means for regulating the output frequency of an alternating current generator comprising an inductance and a capacitance connected in series across the output terminals of said generator, and means responsive to the phase angle between the voltage applied to and current flowing through said inductance and capacitance for altering the speed of said generator in the sense required to restore its output frequency to the resonant frequency of said inductance and capacitance.

6. Means for producing a voltage of magnitude and polarity corresponding respectively to the magnitude and sense of frequency difference between the frequency of a source of alternating current and a desired frequency comprising a series inductive capacitive arrangement resonant at said desired frequency connected to be supplied with alternating current by said source, and means for producing a voltage of polarity and magnitude corresponding to the sense and magnitude of phase difference between the phase of the voltage applied to said resonant circuit and the phase of the current flowing in said circuit as a result of said voltage.

7. A device as recited in claim 6 in which said alternating current source is an alternating current generator, and further comprising a variable speed motor for driving said generator, and magnetic amplifier means for varying the speed of said motor in response to said voltage to thereby maintain the output frequency of said generator at said desired frequency.

8. A device as recited in claim 6 in which said means for producing voltage comprises a first transformer with its primary winding connected to carry current flowing through said inductive capacitive arrangement, a second transformer inductively wound so that its secondary develops voltage 90 degrees out of phase with voltage applied from said alternating current source, and a plurality of rectifiers connecting the secondaries of said transformers to allow current to flow from each end of the secondary winding of said second transformer to like ends of the secondary winding of said first transformer and from each end of the secondary winding of said first transformer to opposite ends of the secondary of said second transformer whereby the magnitude and polarity of the direct current voltage developed between the center taps of said secondary windings is a measure of the magnitude and sense of the difference between the frequency of said source and said desired frequency.

9. Means for producing a voltage of magnitude and polarity corresponding to the magnitude and direction of deviation of the frequency of an alternating current generator from a predetermined frequency comprising an inductive capacitive circuit having a resonant frequency equal to said predetermined frequency connected to receive energy from said generator, a first transformer connected with its primary winding in series with said inductive capacitive circuit, a second transformer inductively wound so that the voltage developed across the secondary thereof is 90 degrees out of phase with the voltage of said alternating current generator, and a plurality of rectifiers connecting the secondary windings of said transformers to allow current flow from each end of the secondary winding of said second transformer to flow to corresponding ends of the secondary windings of said first transformer and from each end of the secondary winding of said first transformer to opposite ends of the secondary winding of said second transformer whereby the voltage across the center taps of said secondary windings is of magnitude and polarity corresponding to the magnitude and direction of deviation of the frequency of said alternating current generator from said predetermined frequency.

10. A device as recited in claim 9 and further comprising a motor for driving said generator, and magnetic amplifier means responsive to said center tap voltage for controlling the speed of said motor.

11. A device as recited in claim 9 in which said inductive capacitive circuit comprises a capacitance and an inductance arranged in series across the output terminals of said generator.

12. A device as recited in claim 9 in which said inductive-capacitive circuit is variably tunable, and further comprising magnetic amplifier means responsive to said center tap voltage for controlling the frequency of said alternating current generator to thereby regulate the frequency of said generator at any desired value.

13. Frequency sensing means comprising an inductive capacitive resonant circuit having a predetermined resonant frequency at which the current through the circuit is in phase with the voltage applied thereto, a first transformer with its primary winding connected to carry said current, a second transformer of high leakage inductance connected to receive an applied alternating current in its primary winding, and rectifiers connecting the secondary windings of said transformers to allow current flow from each end of said second transformer's secondary winding to corresponding ends of said first transformer's secondary winding, and from the ends of said first transformer's secondary winding to the opposite ends of said second transformer's secondary winding whereby the voltage across the center taps of said secondary windings is indicative of the deviation of the frequency of said applied alternating current from said resonant frequency.

References Cited in the file of this patent

UNITED STATES PATENTS

| Number | Name | Date |
| --- | --- | --- |
| 1,694,637 | Bethenod | Dec. 11, 1928 |
| 2,496,730 | Lindbeck et al. | Feb. 7, 1950 |
| 2,525,780 | Dennis | Oct. 17, 1950 |
| 2,581,968 | Norton | Jan. 8, 1952 |